United States Patent [19]

Oku et al.

[11] Patent Number: 5,281,903
[45] Date of Patent: Jan. 25, 1994

[54] METHOD FOR DRIVINGLY CONTROLLING A VARIABLE RELUCTANCE TYPE MOTOR

[75] Inventors: Hideaki Oku; Yo Ikebe, both of Oshino; Hidetsugu Komiya, Hino; Shigeki Kawada, Hachioji; Takeshi Nakamura, Oshino, all of Japan

[73] Assignee: Fanuc Ltd, Minamitsuru, Japan

[21] Appl. No.: 730,847

[22] PCT Filed: Nov. 21, 1990

[86] PCT No.: PCT/JP90/01520
§ 371 Date: Sep. 11, 1991
§ 102(e) Date: Sep. 11, 1991

[87] PCT Pub. No.: WO91/08611
PCT Pub. Date: Jun. 13, 1991

[30] Foreign Application Priority Data
Nov. 24, 1989 [JP] Japan .................. 1-303255

[51] Int. Cl.[5] ............................................. H02P 7/36
[52] U.S. Cl. ..................................... 318/701; 318/439
[58] Field of Search ............... 318/138, 439, 254, 701, 318/685

[56] References Cited

U.S. PATENT DOCUMENTS

| | | | |
|---|---|---|---|
| 4,011,475 | 3/1977 | Schmider | 318/254 |
| 4,039,098 | 8/1977 | Moeder | 318/701 |
| 4,054,943 | 10/1977 | Mundt | 318/701 |
| 4,253,053 | 2/1981 | Ray et al. | 318/701 |

FOREIGN PATENT DOCUMENTS

1496344 11/1974 United Kingdom .

Primary Examiner—William M. Shoop, Jr.
Assistant Examiner—John W. Cabeca
Attorney, Agent, or Firm—Staas & Halsey

[57] ABSTRACT

A drive control method for a variable reluctance type motor capable of improving the motor efficiency by preventing generation of a disturbance torque. In function generators (8A to 8C) of a controller for embodying the method, the motor rotation direction and the motor driving mode are determined based on the generation order of A- and B-phase feedback pulses from a pulse coder (7) and the sign of a torque command (Tc) from a speed loop compensation circuit (1), and, on the basis of the determination results, either one of four excitation patterns is selected. Function signal values corresponding to actual motor electrical angles ($\theta$) are generated from the function generators in accordance with the selected excitation pattern, and excitation of individual phases of the motor (6) is controlled by power amplifiers (4A to 4C) which respond to voltage commands derived based on these function signal values. The excitation interruption timing is so determined as to extinguish a winding current before a disturbance torque is generated by the current which is caused to flow, due to the presence of the inductance of the stator winding, in this winding after the excitation interruption.

6 Claims, 6 Drawing Sheets

METHOD FOR DRIVINGLY CONTROLLING A VARIABLE RELUCTANCE TYPE MOTOR

BACKGROUND OF THE INVENTION

The present invention relates to a method for drivingly controlling a variable reluctance type motor, and more particularly, to a drive control method of this kind capable of improving the efficiency of a motor.

A variable reluctance type motor, which comprises a stator having a plurality of salient poles around which windings are wound and a rotor having a plurality of salient poles, is so arranged as to rotate the rotor by attracting a rotor salient pole near an excited stator salient pole towards the stator salient pole by a magnetic attraction force caused by the excited stator salient pole. At this time, the rotary torque applied to the rotor acts in a direction to reduce the magnetic resistance between the stator salient pole and the rotor salient pole, irrespective of the direction of a current flowing in the stator winding. That is, during the rotor rotation, the rotary torque acting in the direction of the rotor rotation is applied to the rotor from an instant at which the rotor salient pole starts to face the excited stator salient pole (unalign position) until an instant at which the rotor salient pole is brought to completely face the stator salient pole (align position). Thereafter, when the rotor further continues to rotate in the same direction, the rotary torque acting in a direction opposite to the rotation direction of the rotor is applied to the rotor salient pole until the rotor salient pole starts to be deviated from a state where it faces the stator salient pole.

For example, in case that the rotor 21 rotates in a counterclockwise direction relative to the stator 20 as shown in FIGS. 4A and 4B, the rotary torque acting in the rotor rotation direction or the counterclockwise direction is applied to a rotor salient pole 21a from the time when the leading edge 21a', as viewed in the rotor rotation direction, of the rotor salient pole 21a has reached a position on an extension of the leading edge 20A' of an excited stator salient pole 20A of A-phase and hence the rotor salient pole 21a has reached that rotary position unalign position (electrical angle of 0 degree) of the rotor which is shown in FIG. 4A at which it starts to face the stator salient pole 20A until the time at which the rotor salient pole 21a has reached a rotor rotary position align position (electrical angle of 180 degrees) shown in FIG. 4B at which it completely faces the stator salient pole 20A, with the axes of the rotor salient pole 21a and the stator salient pole 20A brought to be coincide with each other. When the rotor 21 continues to further rotate in the counterclockwise direction after having reached the rotor rotation position shown in FIG. 4B, the rotary torque acting in a direction opposite to the rotor rotation direction or the clockwise direction is applied to the rotor salient pole 21a until the trailing edge 21a" of the rotor salient pole 21a reaches a position on the extension unalign position (again) (electrical angle of 360 degrees) of the trailing edge 20A" of the stator salient pole 20A and hence the rotor salient pole 21a starts to be deviated from a state where it faces the stator salient pole 20A. At the time of releasing from the state where the rotor salient pole 21a faces the stator salient pole 20A, the leading edge 21d' of the next rotor salient pole 21d reaches a position on the extension of the leading edge 20A' of the stator salient pole 20A, so that the rotor salient pole 21d starts to face the stator salient pole 20A.

After all, the acting direction of the rotary torque caused when a stator salient pole of a certain phase is excited is determined in dependence on the rotary position (electrical angle) of the rotor representing the positional relation between the stator salient pole and the rotor salient pole. Thus, in order to cause the variable reluctance type motor to rotate in a desired direction, the respective stator salient poles are sequentially excited in a desired order for a desired period of time in accordance with the rotary position of the rotor. For example, in an example shown in FIGS. 4A and 4B, if the rotor 21 is to be rotated counterclockwise, an A-phase stator winding (not shown) wound around the stator salient pole 20A is energized in a rotor rotation region represented by an electrical angle region of 0 to 180 degrees. On the other hand, in the case of rotating the rotor 21 clockwise, the A-phase stator winding is energized in a rotor rotation region indicated by an electrical angle region of 180 to 360 degrees. Conventionally, in order to control the drive of the variable reluctance type motor, data is read out from a read only memory, in which the above two types of excitation patterns are previously stored, in accordance with the rotary position of the rotor, so that the stator windings of respective phases are each energized in a desired order for a desired period of time.

However, due to the presence of an inductance of the stator winding, a current continues to flow in the winding for a certain period of time after excitation of the stator winding is interrupted. For example, in a case where the A-phase stator winding is energized for an excitation section T1 corresponding to an electrical angle region of 0 to 180 degrees of the rotor in order to rotate the rotor 21 in the counterclockwise direction, a current will flow in the stator winding even in a section T2 corresponding to rotor electrical angle positions which exceed 180 degrees, as shown in FIG. 5. As a result, a disturbance torque acting to rotate the rotor in a direction opposite to the desired rotation direction is generated. Hence, energy is consumed to cancel the disturbance torque, so that the motor efficiency will be lowered.

SUMMARY OF THE INVENTION

An object of the present invention is to provide a method for drivingly controlling a variable reluctance type motor, which is capable of reducing or preventing generation of a disturbance torque acting to rotate a rotor in a direction opposite to a desired rotation direction, thereby improving motor efficiency.

In order to attain the above object, according to the present invention, there is provided a drive control method for use in a variable reluctance type motor which includes a stator having a plurality of salient poles around which windings are wound and a rotor having a plurality of salient poles, the motor being driven in that motor driving mode which is determined in dependence on a difference between a command value of a motor driving parameter and an actual value thereof and which is one of an acceleration mode where a torque acting in a rotation direction of the motor is generated and a deceleration mode where a torque acting in a direction opposite to the rotor rotation direction is generated. The drive control method comprises the steps of: (a) starting excitation of the winding of a to-be-excited stator salient pole when a rotor salient pole near the to-be-excited stator salient pole has reached a first predetermined rotary position which is determined in dependence on the motor driving mode, so as to generate a desired torque acting in a rotation direction suited to the motor driving mode; and (b) interrupting the excitation started in the step (a) when the rotor salient pole has reached a third predetermined rotary position short of a second predetermined rotary position which cooperates with the first predetermined rotary position to define a predetermined rotary angle region where the desired torque is generated by an electric current flowing in the winding associated with the step (a), so as to prevent an electric current from flowing in the winding in a region other than the predetermined rotary angle region.

Preferably, in the acceleration mode, a determination to the effect that the rotor salient pole has reached the first predetermined rotary position is made when the rotor salient pole starts to face the stator salient pole. In the deceleration mode, a determination to the effect that the rotor salient pole has reached the first predetermined position is made when the rotor salient pole is brought to completely face the stator salient pole. Further, the second predetermined rotary position in the acceleration mode is set such that the rotor salient pole will completely face the stator salient pole at that rotary position, and the second predetermined rotary position in the deceleration mode is set such that the rotor salient pole will start to be deviated at that rotary position from a state where it faces the stator salient pole. The third predetermined rotary position is set in dependence on the inductance of the winding. Further, a motor rotation speed is used as the motor driving parameter, and either one of the acceleration mode and the deceleration mode is selected in accordance with the difference between a command value of the motor rotation speed and an actual value thereof. More preferably, the excitation of the winding of the next stator salient pole is started before the third predetermined rotary position is reached.

As described above, according to the present invention, excitation of the winding of the stator salient pole is started when the rotor salient pole has reached the first predetermined rotary position determined in dependence on the motor driving mode, and the excitation is interrupted when the rotor has reached the third predetermined rotary position short of the second predetermined rotary position which cooperates with the first predetermined rotary position to define the predetermined rotary angle region where a desired torque acting in the rotation direction suited to the motor driving mode is generated by an electric current flowing in the winding. Therefore, an electric current caused by the inductance of the winding to flow in the winding after the interruption of the excitation is significantly reduced or extinguished before a disturbance torque acting in a direction opposite to the intended acting direction is generated by the above electric current. As a result, no energy is consumed to cancel the disturbance torque, whereby the motor efficiency can be improved.

Preferably, excitation of the winding of the next stator salient pole is started before the third predetermined rotary position is reached, so that the rotary torque can be continuously generated to smoothly rotate the motor.

DESCRIPTION OF THE PREFERRED EMBODIMENT

Figure 1:
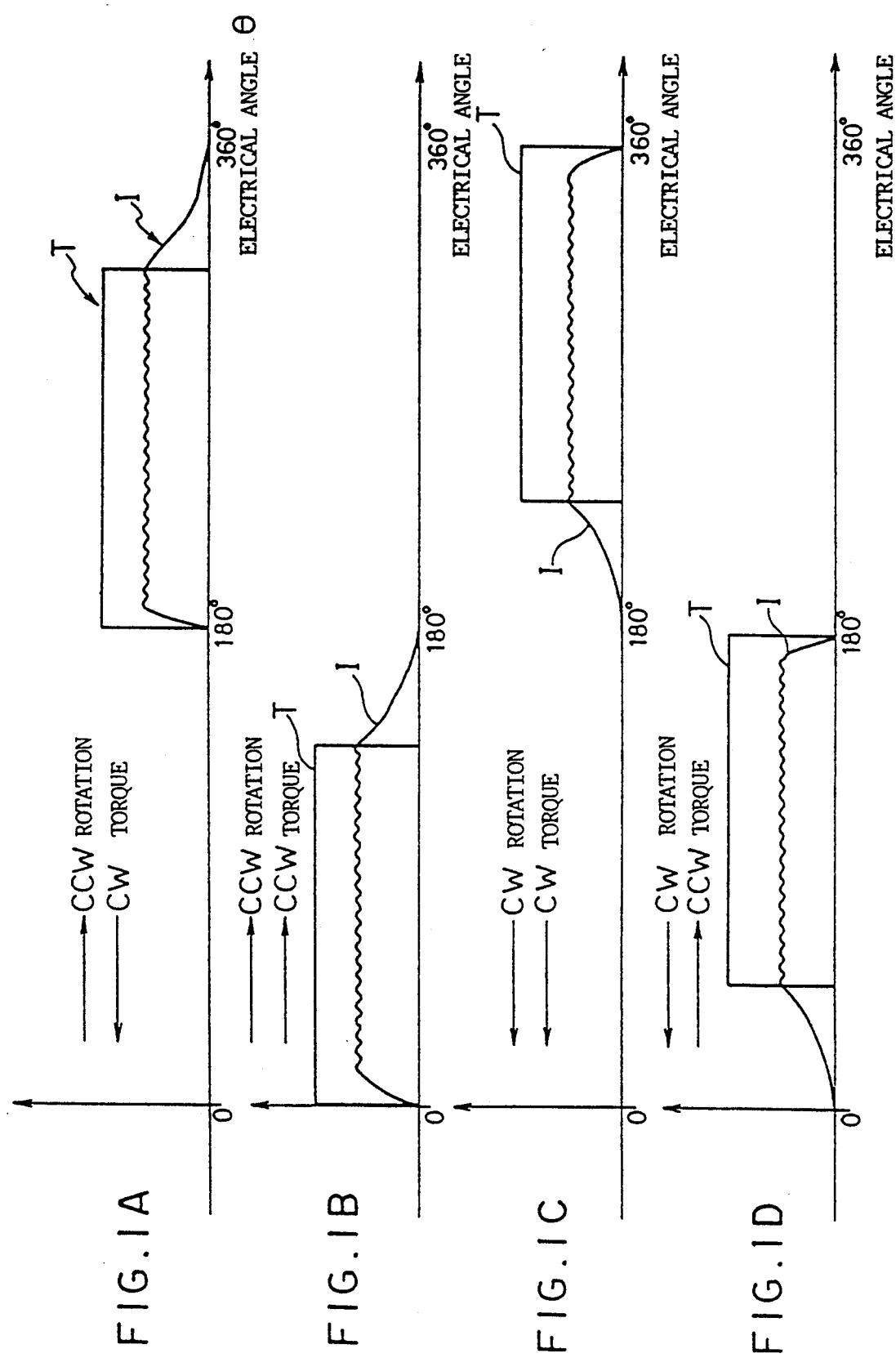
FIG. 1A is a graph showing an excitation section and an actual winding current in the present invention in a case where a variable reluctance type motor is decelerating operated in a counterclockwise direction.
FIG. 1B is a graph, similar to FIG. 1A, for a case where the motor is accelerating operated in the counterclockwise direction.
FIG. 1C is a graph, similar to FIG. 1A, for a case where the motor is accelerating operated in a clockwise direction.
FIG. 1D is a graph, similar to FIG. 1A, for a case where the motor is decelerating operated in the clockwise direction.

With reference to FIGS. 1 and 4, the principle of a method, according to the present invention, for drivingly controlling a reluctance type motor will be explained.

In the present invention, one of four excitation patterns is selected according to whether the motor is to be rotated in a clockwise direction or counterclockwise direction and whether a motor driving mode, which is determined in dependence on the difference between a command value of a motor driving parameter (e.g., motor rotation speed) and an actual value thereof, is either an acceleration mode for generating a torque acting in the motor rotation direction or a deceleration mode for generating a torque acting in a direction opposite to the motor rotation direction.

In the case of driving the motor in the deceleration mode while it is being rotated in the counterclockwise direction, an excitation pattern shown in FIG. 1A is selected. According to this excitation pattern, when the rotor 21 has reached a rotary position (FIG. 4B) indicated by an electrical angle of 180 degrees (align position) and hence the rotor salient pole 21a is brought to completely face the stator salient pole 20A, a determination to the effect that the starting point of the excitation section T is reached is made, so that excitation of the winding (not shown) of the stator salient pole 20A is started. As a result, a torque acting in the clockwise direction which is opposite to the motor rotation direction is generated, so that the motor is deceleratingly operated. Thereafter, the excitation of the winding is interrupted before an electrical angle at 360 degrees (unalign position); and the rotor salient pole 21a starts to be deviated from a state where it faces the stator salient pole 20A. In practice, after the interruption of excitation, and electric current I flows in the winding because of the presence of the inductance of the winding. Therefore, the excitation section T, particularly the termination end thereof, is properly set, so that the winding current I assumes a value of zero or close to zero when the rotor salient pole 21a has reached that rotary position which is represented by an electrical angle of 360 degrees and which corresponds to the rotary position of the rotor salient pole 21b shown in FIG. 4A, and hence the rotor salient pole 21a starts to be deviated from the state where it faces the stator salient pole 20A. As a result, the stator salient pole 20A is de-energized when the facing state between the rotor salient pole 21a and the stator salient pole 20A starts to be broken, that is, when the next rotor salient pole 21d has reached a rotary position corresponding to the rotary position of the rotor salient pole 21a shown in FIG. 4A. Therefore, the rotor salient pole 21d will not be magnetically attracted by the stator salient pole 20A, and no torque acting in the counterclockwise direction is generated, so that the deceleration operation of the motor will not be disturbed.

In a case where the motor is driven in the acceleration mode while it is being rotated in the counterclockwise direction, an excitation pattern shown in FIG. 1B is selected. When the rotor 21 has reached a rotary position of FIG. 4A indicated by an electrical angle of 0 degree, and the rotor salient pole 21a starts to face the stator salient pole 20A, excitation of the winding of the stator salient pole 20A is started. As a result, a torque acting in the counterclockwise direction, which is the same as the motor rotation direction, is generated, whereby the motor is operated acceleratingly. Thereafter, the excitation of the winding is interrupted before the rotor salient pole 21a is brought to completely face the stator salient pole 20A (align position). As a result, the winding current I assumes a value of zero or close to zero when the rotor salient pole 21a has reached a rotary position indicated by an electrical angle of 180 degrees (unalign position) and corresponding to the rotary position shown in FIG. 4B, and hence the rotor salient pole 21a is brought to completely face the stator salient pole 20A. As a result, the stator salient pole 20A is de-energized when the rotor salient pole 21a starts to be further rotated in the counterclockwise direction. Therefore, the rotor salient pole 21a will not be magnetically attracted by the stator salient pole 20A, and no torque acting in the clockwise direction and disturbing the accelerating operation is generated.

Figure 4A:
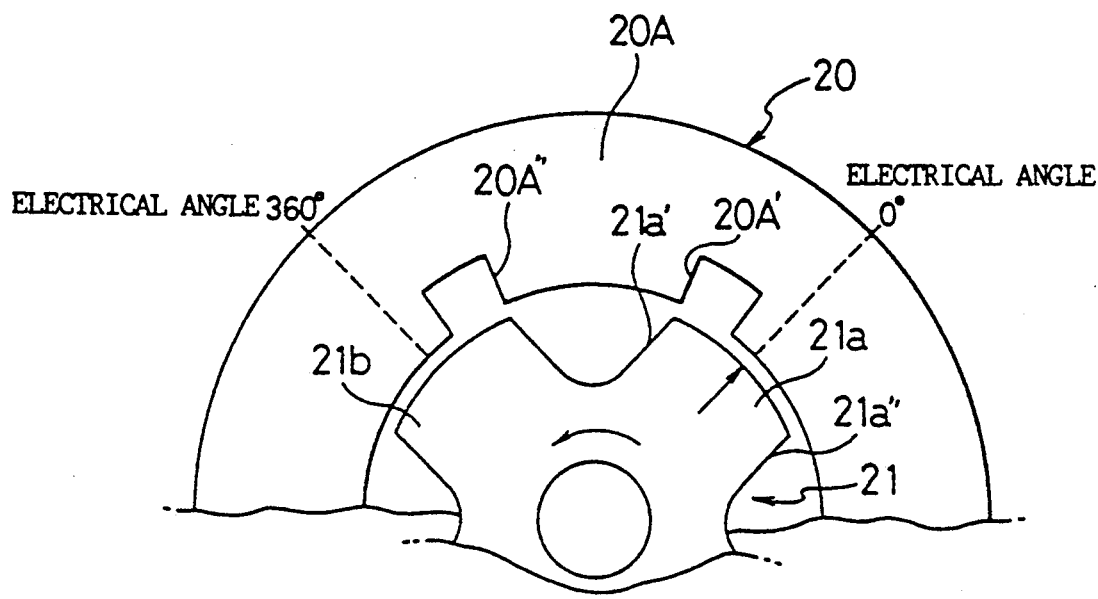
FIG. 4A is a fragmentary schematic view showing a variable reluctance type motor in a state where a rotor salient pole (unalign position) starts to face a stator salient pole.
Figure 4B:
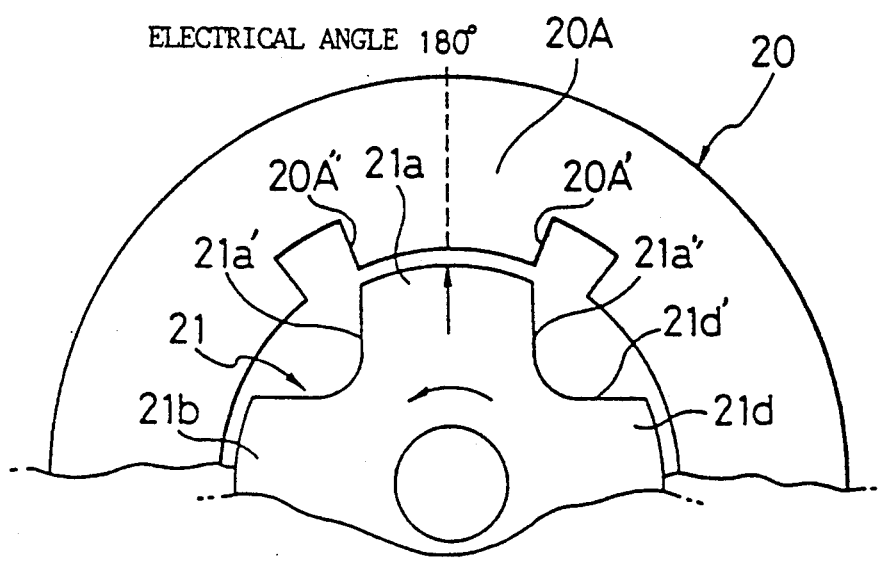
FIG. 4B is a view, similar to FIG. 4A, showing a state where the rotor salient pole completely faces the stator salient pole (align position)
Figure 5:
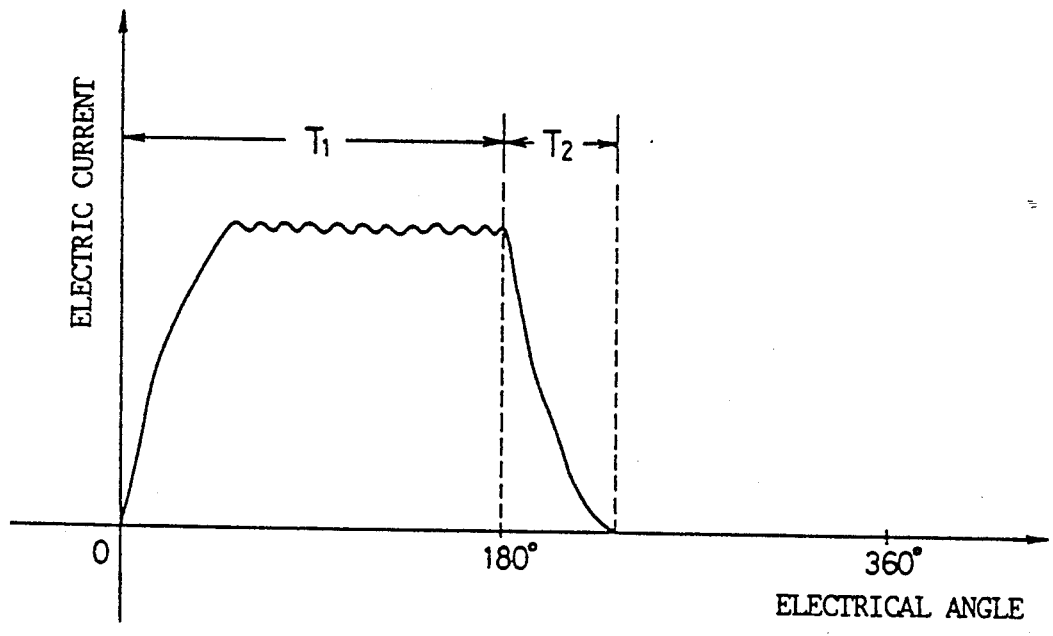
FIG. 5 is a graph showing an excitation section and an actual winding current in a conventional method of drivingly controlling a variable reluctance type motor.

According to an excitation pattern of FIG. 1C which is selected in a case where the motor is to be driven in the acceleration mode while the motor is being rotated in the clockwise direction, which is opposite to the motor rotation direction in the case of FIGS. 4A and 4B, excitation of the winding of the stator salient pole 20A is started when the rotor 21 has reached a rotary position of FIG. 4A indicated by an electrical angle of 360 degrees (unalign position) and hence the rotor salient pole 21b starts to face the stator salient pole 20A, so that a torque acting in the clockwise direction which is the same as the motor rotation direction is generated, whereby the motor is acceleratingly operated. Thereafter, the excitation of the winding is interrupted before the rotor salient pole 21b is brought to completely face the stator salient pole 20A. Then, the winding current I assumes a value of zero or closed to zero when the rotor salient pole 21b has reached a rotary position indicated by an electrical angle of 180 degrees (align position) and corresponding to the rotary position of the rotor 21a shown in FIG. 4B, with the rotor salient pole 21a brought to completely face the stator salient pole 20A. As a result, the stator salient pole 20A is de-energized when the rotor salient pole 21b starts to be further rotated in the clockwise direction. Therefore, the rotor salient pole 21b will not be magnetically attracted by the stator salient pole 20A, and hence no torque acting in the counterclockwise direction and disturbing the accelerating operation is generated.

In a case where the motor is to be driven in the deceleration mode while it is being rotated in the clockwise direction, excitation of the winding of the stator salient pole 20A is started, in accordance with an excitation pattern shown in FIG. 1D, when the rotor 21 has reached a rotary position of FIG. 4B indicated by an electrical angle of 180 degrees (align position) so that the rotor salient pole 21a is brought to completely face the stator salient pole 20A. Accordingly, a torque acting in the counterclockwise direction which is opposite to the motor rotation direction is generated, whereby the motor is operated deceleratingly. Thereafter, the excitation of the winding is interrupted before the rotor salient pole 21a starts to be deviated from the state in which it faces the stator salient pole 20A, whereby the current I is caused to assume a value of zero or close to zero when the rotor salient pole 21a has reached a rotary position indicated by an electrical angle of 0 degree (unalign position) and shown in FIG. 4A, and when the rotor salient pole 21a starts to be deviated from the facing state between itself and the stator salient pole 20A. As a result, the stator salient pole 20A is de-energized when the facing state between the rotor salient pole 21a and the stator salient pole 20A starts to be broken, that is, when the next rotor salient pole 21b has reached the rotary position shown in FIG. 4A and starts to face the stator salient pole 20A. Therefore, the rotor salient pole 21b will not be magnetically attracted by the stator salient pole 20A, and no torque acting in the clockwise direction and disturbing the deceleration operation is generated.

The above four excitation patterns, particularly the electrical angle positions of the rotor at the time of excitation interruption in the respective excitation patterns, are determined, for instance, by actual measurements conducted while the motor is being rotated at a rotational speed at the time of use of the motor. Preferably, in a multi-phase motor, the electrical angles of the rotor at the excitation starting time and excitation interruption time are determined in such a manner that the difference between the electrical angles of the rotor at the excitation starting time and excitation interruption time never be smaller than an electrical angle derived by dividing the electrical angle of 360 degrees by the number of motor phases. By this electrical angle determination, a stator winding of either one of the phases of the multi-phase motor is necessarily excited in any motor rotary position, so that a motor rotation angle region where no motor output torque is generated never appears.

Figure 6:
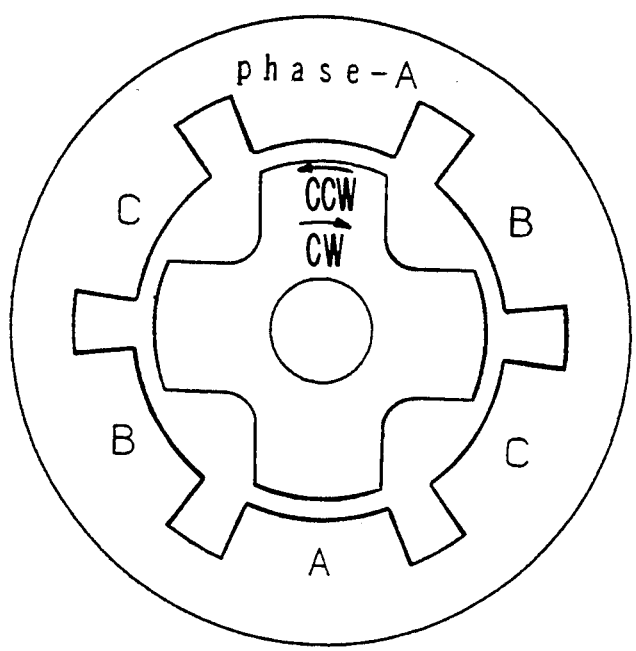
FIG. 6 is a vertical sectional view of a 3-phase variable reluctance type motor, without windings, for use in the drive control method shown in FIGS. 2A–2D.

In the following, with reference to FIGS. 2A to 2D, a drive control method according to one embodiment of the present invention for use in a 3-phase variable reluctance type motor (shown in FIG. 6) will be explained.

The present embodiment is so arranged as to control the excitation of the stator winding of each phase in accordance with that corresponding one of the four excitation patterns which is determined in dependence on the motor rotation direction and the motor driving mode. Further, the excitation section T of each phase of the motor is set to have an electrical angle of 135 degrees. That is, the excitation is interrupted when the rotor has rotated through an electrical angle of 135 degrees after start of the excitation. The electrical angle shown in the drawing is associated with the A-phase excitation pattern, and the B- and C-phases are shifted with respect to the A-phase by 120 and 240 degrees, respectively.

Figure 2:
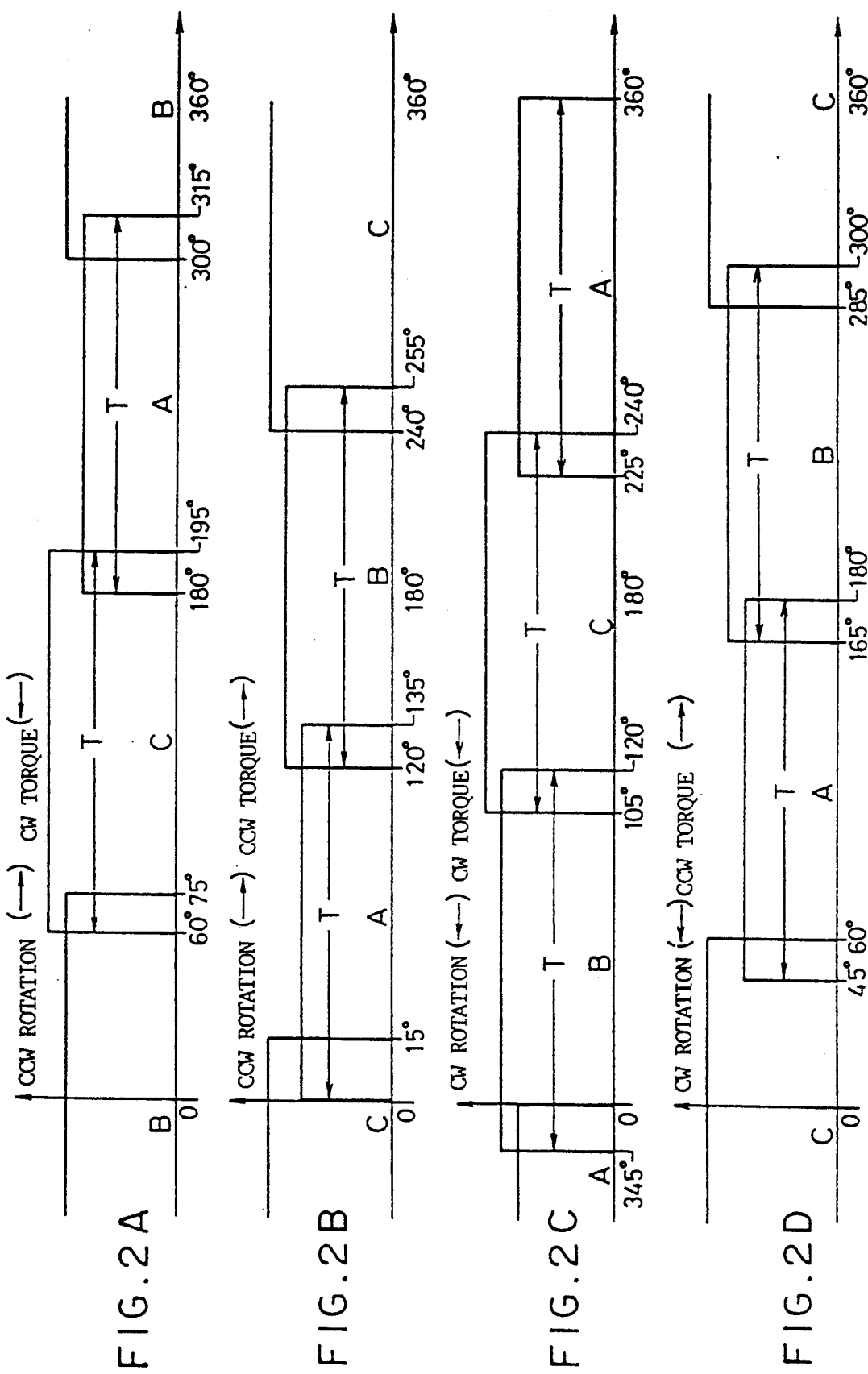
FIG. 2A is a graph showing an excitation section in a case where a 3-phase variable reluctance type motor is decelerating operated in the counterclockwise direction by means of a drive control method according to one embodiment of the present invention.
FIG. 2B is a graph, similar to FIG. 2A, for a case where the motor is accelerating operated in the counterclockwise direction.
FIG. 2C is a graph, similar to FIG. 2A, for a case where the motor is accelerating operated in the clockwise direction.
FIG. 2D is a graph, similar to FIG. 2A, for a case where the motor is decelerating operated in the clockwise direction.

In a case where the motor is to be driven in the deceleration mode while the motor is being rotated in the counterclockwise direction, the excitation of the A-, B- and C-phase stator windings is controlled in accordance with the excitation pattern of FIG. 2A. When that rotary position of the rotor is reached, which is indicated by an electrical angle of 180 degrees and at which the rotor salient pole completely faces the A-phase stator salient pole, the excitation of the A-phase stator winding is started to excite the A-phase stator salient pole, whereby a torque acting in the clockwise direction which is opposite to the motor rotation direction is generated, and the motor is operated deceleratingly. Thereafter, when the rotor is further rotated by an electrical angle of 15 degrees and reaches the rotary position indicated by an electrical angle of 195 degrees (=180 degrees+15 degrees), the C-phase excitation started as will be described later is interrupted.

When the rotor is further rotated by an electrical angle of 120 degrees from the A-phase excitation starting time and reaches the rotary position indicated by an electrical angle of 300 degrees (=180 degrees+120 degrees), another rotor salient pole (hereinafter referred to as a second rotor salient pole) is brought to completely face the B-phase stator salient pole. At this time, the B-phase excitation is started to excite the stator salient pole so that a torque acting in the clockwise direction to decelerate the motor is generated. When the rotor is further rotated by an electrical angle corresponding to the A-phase excitation section T from the A-phase excitation starting time and reaches the rotary position indicated by an electrical angle of 315 degrees (=180 degrees+135 degrees), the A-phase excitation is interrupted. Even after the interruption of excitation, an electric current is caused to continuously flow in the A-phase stator winding due to the presence of the inductance of the winding, whereby a torque which acts to decelerate the motor is generated. On the other hand, however, when the rotor has reached the rotary position indicated by an electrical angle of 360 degrees or a position in the vicinity of that rotary position, the winding current is extinguished, thereby preventing generation of a torque which accelerates the motor.

When the rotor is rotated by an electrical angle of 120 degrees from the B-phase excitation starting time and reaches the rotary position indicated by an electrical angle of 60 degrees (=300 degrees+120 degrees) and hence the second rotor salient pole is brought to completely face the C-phase stator salient pole, excitation of the C-phase stator winding is started. When the rotor is further rotated by an electrical angle of 15 degrees from the C-phase excitation starting time and reaches the rotary position indicated by an electrical angle of 75 degrees (=420 degrees+15 degrees=300 degrees+135 degrees) and corresponding to the termination end of the B-phase excitation section T, the B-phase excitation is interrupted. The B-phase winding current is caused to continuously flow due to the presence of the inductance of the winding until the rotary position indicated by an electrical angle of 120 degrees is reached, so that the torque which acts to decelerate the motor is generated.

When the rotor is rotated through an electrical angle of 15 degrees to reach the rotary position (an electrical angle of 195 degrees) corresponding to the termination end of the C-phase excitation section T after the rotor rotary position of an electrical angle of 180 degrees has been reached and the A-phase excitation has been started again, the C-phase excitation is interrupted as described before. Due to the presence of the inductance of the winding, an electric current is caused to continuously flow in the C-phase stator winding until the rotor rotary position of an electrical angle of 240 degrees is reached, so as to generate a torque which decelerates the motor. Subsequently, the A-, B- and C-phase excitation control operations are repeated, whereby the motor is operated deceleratingly.

In case that the motor is acceleratingly operated while it is being rotated in the counterclockwise direction according to the excitation pattern of FIG. 2B, the A-phase excitation is started at that rotor rotary position (an electrical angle of 0 degree) at which the rotor salient pole starts to face the A-phase stator salient pole, whereas the A-phase excitation is interrupted at that rotary position (an electrical angle of 135 degrees) which is short, by an electrical angle of 45 degrees, of that rotor rotary position (an electrical angle of 180 degrees) at which the rotor salient pole completely faces the A-phase stator salient pole. Further, the B-phase excitation which has been started at the rotary position (an electrical angle of 120 degrees) at which the rotor salient pole starts to face the B-phase stator salient pole is interrupted at the rotary position (an electrical angle of 255 degrees) which is short, by an electrical angle of 45 degrees, of the rotary position at which the rotor salient pole completely faces the B-phase stator salient pole. Furthermore, the C-phase excitation is effected in a rotor rotary angle region corresponding to an electrical angle region of 240 to 15 degrees. The torque acting in the counterclockwise direction is applied to the rotor with the excitation of the individual phases, whereas the winding current caused to flow after the interruption of excitation is rendered to be extinguished before it acts to generate a substantial torque exerting in the clockwise direction.

In case that the motor is acceleratingly operated while it is being rotated in the clockwise direction, the A-, B- and C-phase excitation operations are started at those rotary positions (electrical angles of 360 degrees, 120 degrees and 240 degrees) at which the rotor salient pole starts to face the A-, B- or C-phase stator salient poles as shown in FIG. 2C, so that a torque acting in the clockwise direction to accelerate the motor is generated by the excitation. Thereafter, the excitation is interrupted when the rotor is rotated by a rotation angle, corresponding to the excitation section T of an electrical angle of 135 degrees, to reach the rotary position (an electrical angle of 225 degrees, 345 degrees or 105 degrees) corresponding to the termination end of the excitation section T. A winding current caused to flow after the interruption of excitation is extinguished before it generates a substantial torque acting in the counterclockwise direction.

In case that the motor is deceleratingly operated while it is being rotated in the clockwise direction, the A-, B- and C-phase excitation operations are started at the respective rotor rotary positions (electrical angles of 180 degrees, 300 degrees and 60 degrees) at which the rotor salient pole completely faces the A-, B- or C-phase stator salient poles as shown in FIG. 2D, and a torque acting in the counterclockwise direction is generated by the excitation so that the motor is decelerated. Thereafter, the excitation is interrupted when the rotor is rotated by a rotation angle of an electrical angle of 135 degrees to reach the rotary position (an electrical angle of 45 degrees, 165 degrees or 285 degrees) corresponding to the termination end of the excitation section T. A winding current caused to flow after the interruption of excitation is extinguished before it generates a substantial torque in the clockwise direction.

In the following, a controller for embodying the method of the above embodiment will be explained with reference to FIG. 3.

The controller comprises A-, B- and C-phase function generators 8A, 8B and 8C each of which includes a read only memory (ROM), not shown, storing therein four types of excitation patterns (FIGS. 2A to 2D). Each of the excitation patterns consists of function signal values respectively set for each rotor electrical angle region, and those excitation patterns stored in the ROMs which correspond to one another are different in phase from one another by an electrical angle of 120 degrees.

The controller further comprises a frequency-to-voltage converter 9 for converting the frequency at which A- or B-phase feedback pulses are sequentially delivered from a pulse coder 7 mounted on a 3-phase variable reluctance type motor 6 with rotation of the motor into a voltage representative of the actual motor speed, and a speed loop compensation circuit 1 for amplifying the difference (speed deviation) between a speed command Vc supplied from a host controller, not shown, and an output of the converter 9, to thereby generate a torque command Tc. Each of the function generators 8A to 8C, which is connected to the pulse coder 7 and the compensation circuit 1, is arranged to determine the rotation direction of the motor in accordance with the generation order of the A- and B-phase feedback pulses, and determine the motor driving mode in accordance with the positive or negative sign of the torque command Tc. Further, each function generator is arranged to generate that one of the function signal values, constituting the predetermined excitation patterns selected in accordance with the results of both the determinations, which corresponds to an actual rotor electrical angle $\theta$ represented by the feedback pulses from the pulse coder 7.

Moreover, the controller comprises multipliers 2A to 2C for multiplying the function signal value from a corresponding one of the function generators 8A to 8C by the torque command Tc from the compensation circuit 1 to generate current commands ir(A) to ir(C), current detectors 5A to 5C, current loop compensation circuits 3A to 3C for respectively amplifying differences (current deviations) between corresponding ones of actual currents ic(A) to ic(C) detected by the current detectors and the current commands ir(A) to ir(C) to generate voltage commands er(A) to er(C), and power amplifiers 4A to 4C, each comprised of a PWM inverter and the like, for respectively converting the voltage commands er(A) to er(C) into voltages er'(A) to er'(C) applied to the individual phases of the motor 6.

Figure 3:
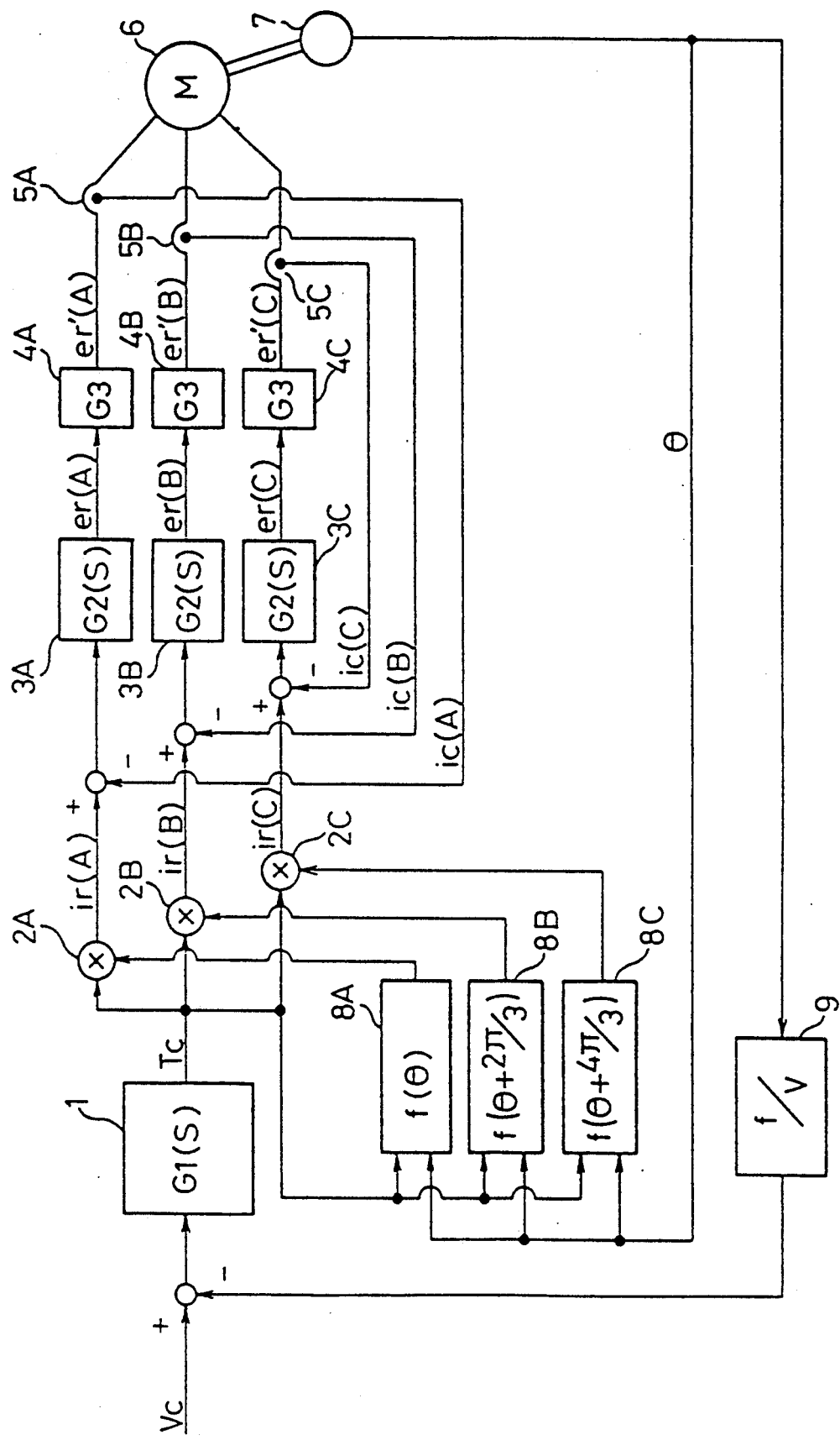
FIG. 3 is a block diagram showing essential part of a controller for embodying the method according to the embodiment shown in FIGS. 2A to 2D.

In FIG. 3, symbols G1(S) and G2(S) respectively denote the transfer function of the speed loop compensation circuit 1 and the transfer function of each of the current loop compensation circuits 3A to 3C, and a symbol G3 denotes the gain of each of the power amplifiers 4A to 4C.

In the following, the operation of the controller of FIG. 3 will be explained.

The generation frequency of the A- or B-phase feedback pulses sequentially generated from the pulse coder 7 with rotation of the motor 6 is converted, in the frequency/voltage converter 9, into a voltage representative of an actual motor speed. Then, in the speed loop compensation circuit 1, a torque command Tc is created in accordance with the deviation between the speed command Vc from the host controller and an output of the converter 9. Each of the function generators 8A to 8C determines the motor rotation direction and the motor driving mode on the basis of the generation order of the A- and B-phase feedback pulses and the sign of the torque command Tc, and selects one of the four types of excitation patterns shown in FIGS. 2A to 2D in accordance with the results of these determinations. For example, if it is determined that the motor 6 should be driven in the counterclockwise direction in the deceleration mode, each of the function generators 8A to 8C selects the excitation pattern of FIG. 2A and then supplies that one of the function signal values constructing the thus selected excitation pattern which corresponds to an actual motor electrical angle $\theta$ represented by the feedback pulses from the pulse coder 7. The current commands ir(A) to ir(C) are derived in the multipliers 2A to 2C on the basis of the function signal values from the function generators 8A to 8C and the torque command Tc, and actual currents ic(A) to ic(C) are detected by means of the current detectors 5A to 5C. Then, the voltage commands er(A) to er(C) derived in the loop compensation circuits 3A to 3C on the basis of the current commands and the actual currents are converted into voltage commands er(A) to er(C) in the power amplifiers 4A to 4C and then applied to the individual phases of the motor.

Subsequently, a proper excitation pattern is selected in accordance with the speed command Vc and the feedback pulses, and function signal values constructing the selected excitation pattern are sequentially read out with rotation of the motor and supplied for the motor control. As a result, the motor 6 is driven in the acceleration mode or deceleration mode, so that the motor 6 is rotated in a desired direction at a desired speed. In addition, as described with reference to FIGS. 2A to 2D, an electric current caused to flow in each of the stator windings of the individual phases of the motor 6 due to the presence of inductance of each winding after the interruption of excitation of that winding a extinguished or markedly reduced before the same current acts to generate a disturbance torque exerting in a direction opposite to a desired motor rotation direction. Therefore, generation of a substantial disturbance torque can be prevented, whereby the motor efficiency can be improved.

We claim:

1. A drive control method for a variable reluctance type motor comprising a stator having a plurality of salient poles around which windings are wound and a rotor having a plurality of salient poles, the motor being driven in a motor driving mode which is determined in dependence on a difference between a command value of a motor driving parameter and an actual value, the motor driving mode being one of an acceleration mode where a torque acting in a rotation direction of the rotor is generated and a deceleration mode where a torque acting in a direction opposite to the rotor rotation direction is generated, said method comprising the steps of:

(a) starting excitation of the winding of a to-be-excited stator salient pole when a rotor salient pole near the to-be-excited stator salient pole has reached a first predetermined rotary position determined in dependence on the motor driving mode, for generating a desired torque acting in a rotation direction suited to the motor driving mode; and (b) interrupting the excitation started in said step (a) when the rotor salient pole has reached a third predetermined rotary position short of a second predetermined rotary position which cooperates with the first predetermined rotary position to define a predetermined rotary angle region where the desired torque is generated by an electric current flowing in the winding associated with said step (a), for preventing an electric current from flowing in the winding in a region other than the predetermined rotary angle region.

2. A drive control method for a variable reluctance type motor according to claim 1, further comprising the substeps of:

i) determining that the rotor salient pole has reached the first predetermined rotary position during the acceleration mode when the rotor salient pole begins to be opposite the stator salient pole; and ii) determining that the rotor salient pole has reached the first predetermined rotary position during the deceleration mode when the rotor salient pole is brought to be completely opposite the stator salient pole.

3. A drive control method for a variable reluctance type motor according to claim 2, further comprising the substeps of:

i) setting the second predetermined rotary position during the acceleration mode such that the rotor salient pole will be completely opposite the stator salient pole at that rotary position; and ii) setting the second predetermined rotary position during the deceleration mode such that the rotor salient pole will start to be deviated at that rotary position from a state where it is opposite the stator salient pole.

4. A drive control method for a variable reluctance type motor according to claim 1, further comprising the substep of setting the third predetermined rotary position in dependence on an inductance of the winding.

5. A drive control method for a variable reluctance type motor according to claim 1, further comprising the substeps of:

i) using a motor rotation speed as the motor driving parameter; and ii) selecting either one of the acceleration mode and the deceleration mode in accordance with a difference between a command value of the motor rotation speed and an actual value thereof.

6. A drive control method for a variable reluctance type motor according to claim 1, further comprising the substep of starting the excitation of the winding of a next stator salient pole before the third predetermined rotary position is reached.

* * * * *